Figure 1:
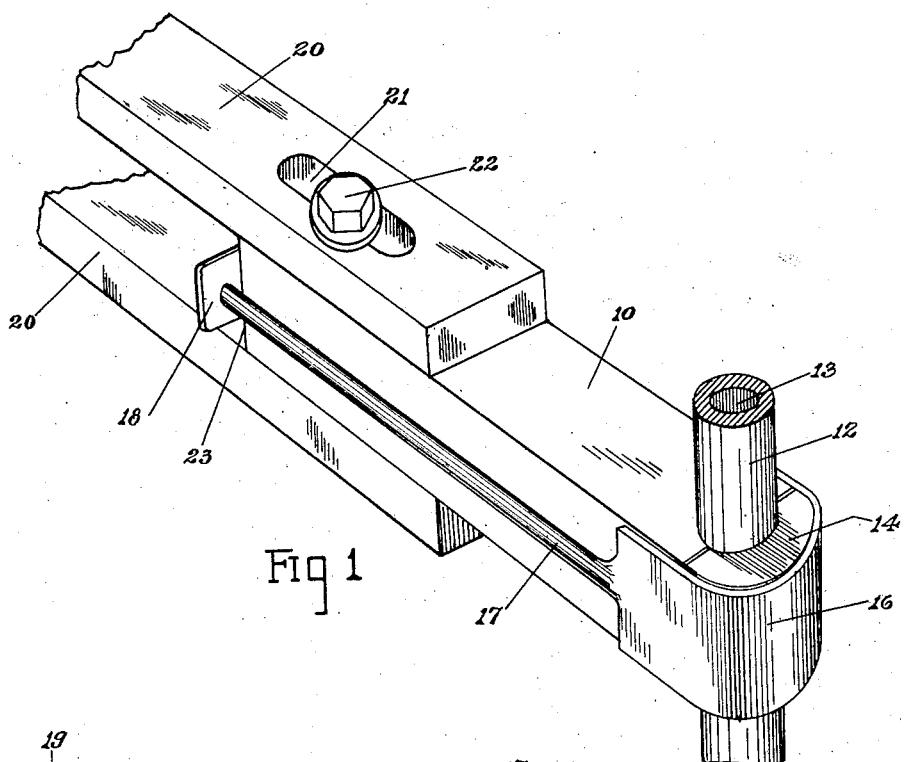

April 21, 1925.  1,534,457

J. W. MEADOWCROFT

ELECTRODE CLAMPING DEVICE FOR ELECTRIC WELDING MACHINES

Filed Aug. 16, 1921

INVENTOR.
Joseph W. Meadowcroft
BY
C. B. DesJardins
ATTORNEY

Witness
Walter M. Trout

Patented Apr. 21, 1925.

1,534,457

UNITED STATES PATENT OFFICE.

JOSEPH W. MEADOWCROFT, OF PHILADELPHIA, PENNSYLVANIA, ASSIGNOR TO EDWARD G. BUDD MANUFACTURING COMPANY, OF PHILADELPHIA, PENNSYLVANIA, A CORPORATION OF PENNSYLVANIA.

ELECTRODE-CLAMPING DEVICE FOR ELECTRIC WELDING MACHINES.

Application filed August 16, 1921. Serial No. 492,696.

*To all whom it may concern:*

Be it known that I, JOSEPH W. MEADOWCROFT, a citizen of the United States, residing at Philadelphia, Pennsylvania, have invented certain new and useful Improvements in Electrode-Clamping Devices for Electric Welding Machines (Case B), of which I declare the following to be a full, clear, and exact description.

My invention relates to an improved device for releasably locking or clamping the electrodes used in electric welding machines. It relates particularly to a device for clamping the electrode in position relative to the stationary arm of an electric spot-welding machine.

The stationary arm of an electric spot-welder is usually made of copper so as to furnish a path of low resistance for the welding current. Heretofore, it has been the common practice to insert the electrode through a transverse opening in the arm and to clamp it in place in such opening by a set screw. This has proven objectionable because the workman, in adjusting the electrode to compensate for wear, very often pounds on the end of the arm to start the electrode from its seat. This tends to distort and destroy the opening for the electrode, is very destructive of the soft copper arm and shortens its life very materially.

The object of my invention is to provide a device for locking or clamping the electrode in an electric welding machine of such a nature that the supporting arm will be adequately protected from blows in adjusting the electrode and the objections noted above will be eliminated.

Another object of my invention is to provide a clamping device for the electrode which shall be quickly and easily releasable, to permit adjustment or removal of the electrode, and which provides an adequate electrical contact between the electrode and the supporting arm.

Figure 2:
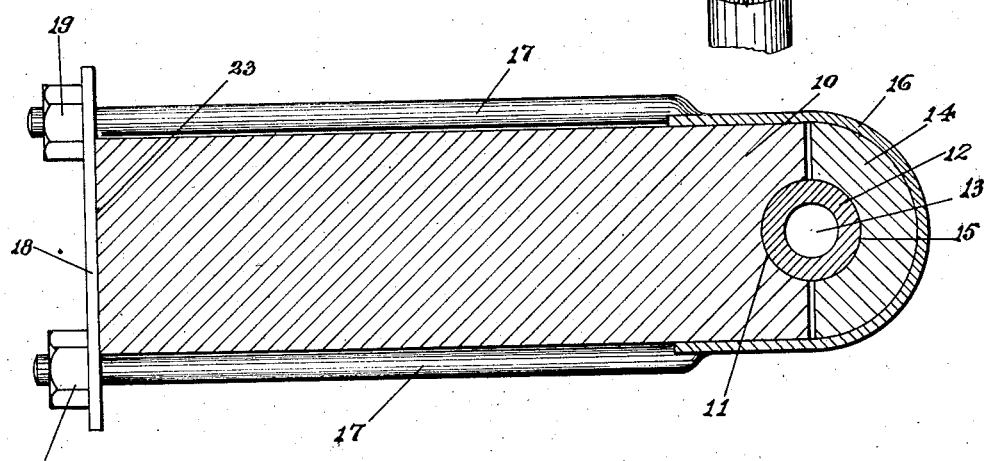

Further objects, and objects relating to details and economies of construction and operation, will definitely appear from the detailed description to follow. My invention is clearly defined and pointed out in the appended claims. A structure, constituting one preferred embodiment of my invention, is illustrated in the drawing, forming a part of this specification, in which:

Fig. 1 is a perspective view of the end of the stationary arm of an electric welding machine, showing an electrode clamped thereto by a device constructed in accordance with my invention, and Fig. 2 is a longitudinal, sectional view taken on a horizontal plane.

In the drawing, similar reference numerals refer to similar parts throughout the several views.

In general, my invention consists in providing a transverse seat in the end of the stationary supporting arm, in which the electrode seats, the seat being of such a character as to give ample surface contact between the supporting arm and the electrode. The electrode is clamped rigidly and firmly in said seat by a block having a complementary seat for the electrode and secured to the end of the arm by suitable means such as a yoke embracing said block and secured to the arm by adjustable means which will draw the block toward the end of the arm to clamp the electrode in its seat.

The structure illustrated in the accompanying drawing constitutes one embodiment of my invention and comprises the stationary supporting arm, 10, which is carried by the bars, 20, in the usual manner, being connected thereto by bolt, 22, passing through the arm, 10, and slot, 21. A concave, transverse seat, 11, is formed in the end of the arm, 10, to receive the electrode, 12. As is customary and usual in electric welding machines, the supporting arm, 10, and the electrode, 12, are both of copper, so that the welding current has a path of low resistance through the arm and the electrode to the weld. In order to keep the resistance low, it is also desirable that the area of surface contact between the arm, 10, and the electrode, 12, be large and, therefore, I provide the concave or half-round seat, 11, in which the electrode is clamped. The electrode may be provided with a central passage, 13, through which water flows for cooling purposes.

In order to clamp the electrode rigidly and firmly in its seat and, at the same time, provide for its quick release for removing or adjusting the electrode, I provide a clamping block, 14, which has a concave seat, 15, fitting and engaging that part of the electrode projecting from the seat, 11. This clamping block, 14, fits on the end of the arm, 10, and is releasably secured thereto so as to clamp the electrode, 12, between the block and the end of the arm. The outer surface of the block, 14, is suitably curved so as to fit in and be embraced by the steel yoke or shackle strap, 16, which has the rearwardly extending threaded rods, 17, extending along the sides of arm, 10. These rods, 17, extend through a strap, 18, which engages the shoulder or surface, 23, at the rear end of arm, 10, and the shackle or yoke is fastened to the arm, by the nuts, 19, screwed on the threaded ends of rods, 17, and engaging the strap, 18.

It will be seen that, when the nuts, 19, are screwed up, the yoke, 16, and block, 14, will be drawn toward the end of arm, 10, so as to clamp the electrode, 12, rigidly in its seat, 11. The electrode can be released speedily and easily by loosening the nuts, 19. The arm, 10, is protected from blows since the only parts projecting, so as to be pounded or hammered by a workman, are the steel yoke, 16, and the block, 14. Pounding will not damage the steel yoke and, if the block, 14, is battered or distorted, it is a simple and relatively inexpensive matter to provide a new block.

I am aware that the embodiment shown here may be varied considerably without departing from the spirit of my invention and, therefore, I claim my invention broadly, as indicated by the appended claims.

Having thus described my invention, what I claim as new and desire to secure by Letters Patent is:—

1. An electrode clamping device for electric welding machines comprising, in combination with an arm of the welding machine having a concave electrode seat at one end thereof to receive an electrode, a clamping block on the end of said arm provided with a concave seat engaging said electrode, a yoke embracing said block and provided with threaded rods, and means engaging said rods for adjustably connecting said yoke to said arm.

2. An electrode clamping device for electric welding machines comprising, in combination with an arm of the welding machine having a concave electrode seat at one end thereof to receive an electrode, a clamping block on the end of said arm provided with a concave seat engaging said electrode, a yoke embracing said block and provided with threaded rods, a strap engaging a portion of said arm and through which rods extend, and nuts screwed on said threaded rods and engaging said strap.

In testimony whereof I affix my signature.

JOSEPH W. MEADOWCROFT.